United States Patent
Proux (10) Patent No.: US 9,053,423 B2
(45) Date of Patent: Jun. 9, 2015

(54) ASSISTED UPDATE OF KNOWLEDGE BASE FOR PROBLEM SOLVING

(71) Applicant: Xerox Corporation, Norwalk, CT (US)

(72) Inventor: Denys Proux, Vif (FR)

(73) Assignee: XEROX CORPORATION, Norwalk, CT (US)

( * ) Notice: Subject to any disclaimer, the term of this patent is extended or adjusted under 35 U.S.C. 154(b) by 281 days.

(21) Appl. No.: 13/849,630

(22) Filed: Mar. 25, 2013

(65) Prior Publication Data
US 2014/0288920 A1    Sep. 25, 2014

(51) Int. Cl.
*G06N 5/02* (2006.01)
*G10L 15/00* (2013.01)
*G06Q 30/00* (2012.01)

(52) U.S. Cl.
CPC ........... *G06N 5/025* (2013.01); *G10L 15/00* (2013.01); *G06Q 30/016* (2013.01)

(58) Field of Classification Search
CPC .......... G06N 5/025; G06N 5/02; G10L 15/00; G06Q 30/016
USPC ........................................................ 706/46
See application file for complete search history.

(56) References Cited

U.S. PATENT DOCUMENTS

| | | | |
|---|---|---|---|
| 6,356,886 B1 * | 3/2002 | Doyle | 706/46 |
| 7,664,642 B2 * | 2/2010 | Espy-Wilson et al. | 704/254 |
| 2006/0197973 A1 | 9/2006 | Castellani et al. | |
| 2006/0212296 A1 * | 9/2006 | Espy-Wilson et al. | 704/254 |
| 2007/0192085 A1 | 8/2007 | Roulland et al. | |
| 2008/0071714 A1 * | 3/2008 | Menich et al. | 706/45 |
| 2008/0294423 A1 | 11/2008 | Castellani et al. | |
| 2009/0106224 A1 | 4/2009 | Roulland et al. | |
| 2009/0292700 A1 | 11/2009 | Castellani et al. | |
| 2012/0150920 A1 | 6/2012 | Roulland et al. | |
| 2014/0222745 A1 * | 8/2014 | Deng et al. | 706/47 |

* cited by examiner

*Primary Examiner* — Daniel Abebe
(74) *Attorney, Agent, or Firm* — Fay Sharpe LLP (57) ABSTRACT

A system and method for proposing candidate solutions for updating a knowledge base are disclosed. In the method, knowledge base solutions in a natural language are each processed to generate a first action sequence of atomic steps, each including a verb and an object including a noun which is in a syntactic dependency with the respective verb. A recorded solution, expressed in a natural language, is received which includes actions performed on a device in the device class. The recorded solution is processed to generate a second action sequence of atomic steps, as for the first action sequence. The second action sequence is compared with the first action sequences to determine whether the recorded solution corresponds to one of the knowledge base solutions. Based on the comparison, provision is made for proposing an update to the knowledge base, based on the recorded solution.

24 Claims, 6 Drawing Sheets

ASSISTED UPDATE OF KNOWLEDGE BASE FOR PROBLEM SOLVING

BACKGROUND

The exemplary embodiment relates to the development of knowledge bases and finds particular application in connection with a system and method for facilitating updating of a knowledge base.

Knowledge bases are widely used to search for answers for a specific problem, such as in call centers, where they are used to find answers to a customer's issues. Often, knowledge bases associate solutions with predefined problems and are often difficult to build, update and curate, because of their size and complexity. At the time of creation, a team of engineers, or other experts familiar with the topic, is engaged in writing problem descriptions and related solutions to solve the problem. Thereafter, further work as the content evolves over time is very complex.

For example, when a company introduces a new product, it may be similar, in some respects to an existing product, but different in others. To leverage the knowledge base content for the existing product, the team is tasked with identifying how similar the new product is to already existing products and to create a new knowledge base (KB) by collecting, from the knowledge bases for the existing products, the parts (problem—solution pairs) that are expected to relate to the new product and importing them into a new KB. The experts may work on specific parts of the new product to estimate what could be the future problems and to write appropriate solutions to be recorded into the new knowledge base. However, it is likely that all potential problems and their solutions are not envisaged at the time the knowledge base is created. Once the product has been put on the market, new problems are identified by the call center staff or technicians in the field. There is then further work involved in importing them into the KB, together with their solutions.

The updating raises problems, such as recognizing that a new problem has been identified, and identifying whether its solution has been already identified as a solution to an existing problem in the KB. In the case of a new solution, problems include recognizing that this is an alternative solution for an existing problem, and determining how to capture new solutions and deciding if and how to record these new solutions inside the KB.

Currently, call center agents may be expected to write a short report (especially when they have tried a solution for a new problem), detailing what they have proposed to the customer. These reports may then be reviewed by the KB expert to decide whether to update the KB. This can be a time consuming process as the problem or solution may already exist in the KB, but this can be difficult to determine.

There remains a need for an automated method for identifying candidate updates for a knowledge base from such descriptions.

INCORPORATION BY REFERENCE

The following references, the disclosures which are incorporated herein in their entireties by reference, are mentioned:

U.S. Pub. No. 20090292700, published Nov. 26, 2009, entitled SYSTEM AND METHOD FOR SEMI-AUTOMATIC CREATION AND MAINTENANCE OF QUERY EXPANSION RULES, by Castellani, et al., discloses a system and method that enable semi-automated generation of query expansion rules for searching a knowledge base.

U.S. Pub. No. 20090106224, published Apr. 23, 2009, entitled REAL-TIME QUERY SUGGESTION IN A TROUBLE SHOOTING CONTEXT, by Roulland, et al., discloses a method for assisting a user to develop a query in a natural language by presenting a subset of ranked query suggestions from a collection of ranked query suggestions to the user as candidates for user queries.

U.S. Pub. No. 20080294423, published Nov. 27, 2008, entitled INFORMING TROUBLESHOOTING SESSIONS WITH DEVICE DATA, by Castellani, et al., discloses a system and method for troubleshooting a problem with a device which includes acquiring device data for the device, receiving a user's query concerning a device in a natural language, presenting possible refinements to at least a portion of the user's query for defining a problem statement, and presenting candidate solutions that are associated with the defined problem statement in a knowledge base informed by the device data.

U.S. Pub. No. 20070192085, published Aug. 16, 2007, entitled NATURAL LANGUAGE PROCESSING FOR DEVELOPING QUERIES, by Roulland, et al., discloses a system suited to self-troubleshooting which receives a natural language user query input by a user that describes a problem experienced with a machine, such as a printer. In the event that stored problem statements are not fully responsive, one or more options for refinement of the user query are provided, based on tags associated with those words of the problem statements which are responsive.

U.S. Pub. No. 20060197973, published Sep. 7, 2006, entitled BI-DIRECTIONAL REMOTE VISUALIZATION FOR SUPPORTING COLLABORATIVE MACHINE TROUBLESHOOTING, by Castellani, et al., discloses a system and method supporting remote interactions between a machine user and a troubleshooting advisor engaged in troubleshooting support activities for a machine. A shared virtual representation of the machine assists a user in implementing an action suggested by the advisor to resolve the troubleshooting need.

U.S. Pub. No. 20120150920, published Jun. 14, 2012, entitled METHOD AND SYSTEM FOR LINKING TEXTUAL CONCEPTS AND PHYSICAL CONCEPTS, by Roulland, et al., discloses a method including extracting candidate noun phrases from a knowledge base for a device and generating a set of candidate concepts based on the extracted noun phrases. A user selects a physical component shown in a graphical representation of the device and a candidate concept which is to be linked to that component. The knowledge base is then indexed based on the mapped concepts.

BRIEF DESCRIPTION

In accordance with one aspect of the exemplary embodiment, a method for proposing candidate solutions for updating a knowledge base is provided. The method includes for each of a set of knowledge base solutions, each knowledge base solution comprising a sequence of main steps, expressed in a natural language, to be performed on a class of device, processing the knowledge base solution to generate a first action sequence including atomic steps. Each of the atomic steps includes a verb and an object. The object includes a noun which is in a syntactic dependency with the verb. A recorded solution is received, expressed in a natural language. The recorded solution includes actions performed on a device in the device class. The recorded solution is processed to generate a second action sequence including atomic steps. Each of the atomic steps includes a verb and an object. The object includes a noun which is in a syntactic dependency with the verb. The second action sequence is compared with each of the first action sequences to determine whether the recorded solution corresponds to one of the knowledge base solutions. Based on the comparison, provision is made for proposing an update to the knowledge base, based on the recorded solution.

One or more of the processing the knowledge base solution, processing the recorded solution, comparing, and proposing updates may be performed with a computer processor.

In accordance with another aspect of the exemplary embodiment, a system for proposing candidate solutions for updating a knowledge base includes memory which stores a set of first action sequences derived from a knowledge base. Each of the first action sequences includes a sequence of atomic steps, at least some of the atomic steps including a verb and an object, the object including a noun which is in a syntactic dependency with the verb. A natural language processing component receives a recorded solution, in a natural language, of actions performed on a device to which the knowledge base relates, and processes the recorded solution to generate a second action sequence of atomic steps, each of the atomic steps including a verb and an object, the object including a noun which is in a syntactic dependency with the verb. A comparison component is provided for comparing the second sequence of atomic steps with the first action sequences to determine whether the recorded solution is a new solution. An update component provides for proposing to update the knowledge base with a candidate new solution, based on the recorded solution. A processor implements the natural language processing component, comparison component, and update component.

In accordance with another aspect of the exemplary embodiment, a method includes providing access to a set of first action sequences stored in memory, which are derived from a knowledge base. Each of the first action sequences includes a sequence of atomic steps, each of the atomic steps including an action. The method further includes receiving a recorded solution, in a natural language, of actions performed on a device in the device class. The recorded solution is processed to generate a second action sequence of atomic steps, each of the atomic steps including an action. The second sequence of atomic steps is compared with the first sequences of atomic steps. This includes comparing the actions in the respective sequences of atomic steps. Based on the comparison, a determination is made as to whether the recorded solution exists in the knowledge base.

One or more of the providing access, processing the recorded solution, comparing the sequences of atomic steps, and determining may be performed with a computer processor.

DETAILED DESCRIPTION

A system and method are provided to facilitate the capture of a solution to a problem in a convenient and standardized way so it can be easily compared with what exists inside a knowledge base (KB). The exemplary system uses a voice (or text) recording device, optionally a speech to text converter, and a grammar of actions. These are used by a natural language processing tool which converts recorded steps into an indexed problem/solution that can be compared with existing content in the knowledge base and added to the content if it is found to be missing.

Figure 1:
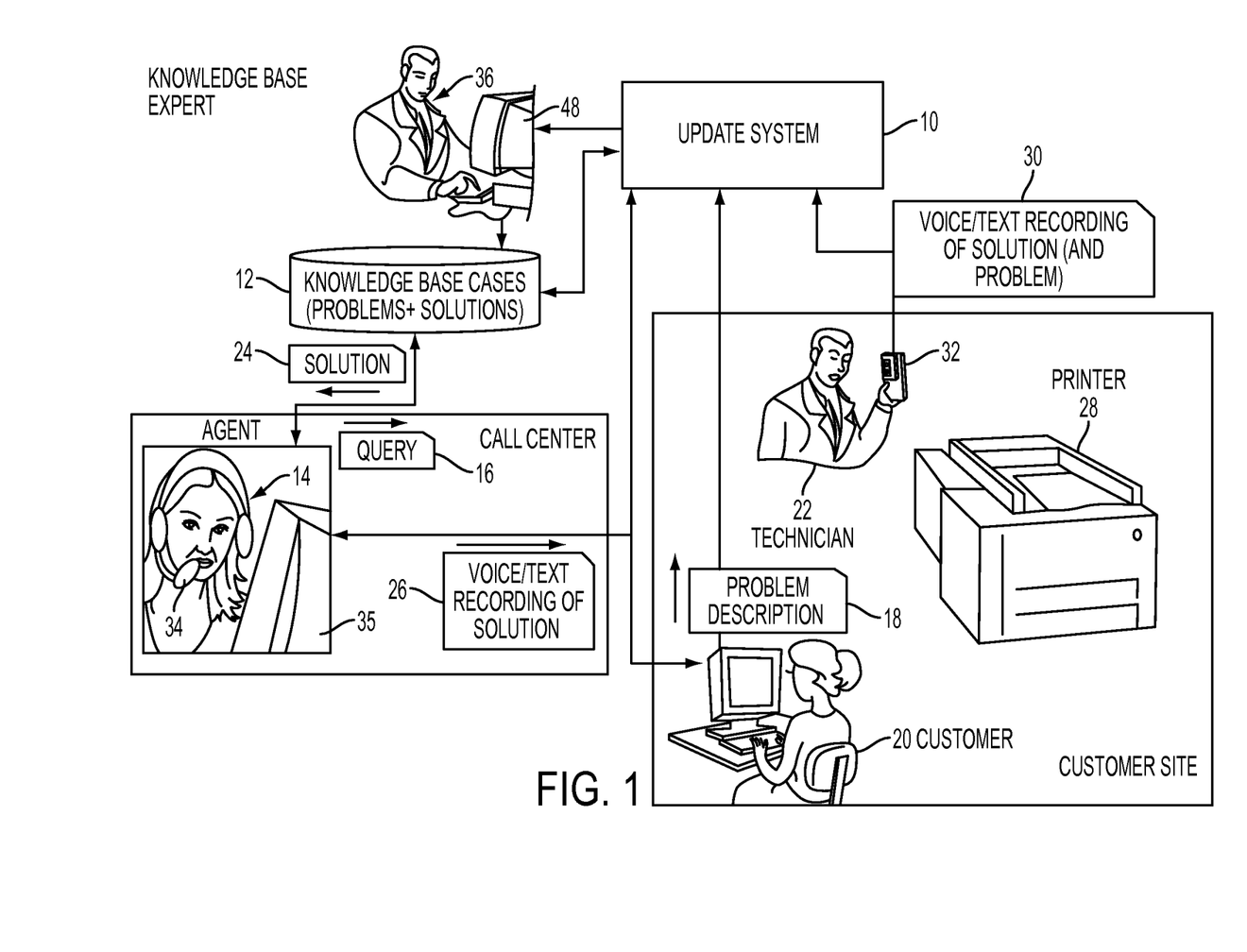
FIG. 1 illustrates an environment in which an exemplary knowledge base update system operates.

With reference to FIG. 1, an environment in which an exemplary knowledge base update system 10 operates is illustrated. The system 10 has access to a knowledge base 12 which includes information relating to a particular model of a device or a class of two or more models of the device. The knowledge base 12 is organized into cases, each case relating to a problem with the device or class of devices, and a set of one or more solutions to the problem, each solution including one or more steps which are to be performed in solving the problem. Since the exact nature of the problem is not always known, the solutions may be designed to be implemented sequentially until one of the solutions is found to solve the observed problem. The problem and its associated solution(s) are described in a natural language, such as English or French so that a person using the knowledge base, such as the illustrated call center agent 14, may access the knowledge base with natural language query 16. The query 16 may be formulated by the agent 14 based on a verbal or textual problem description 18 submitted by a customer 20, e.g., from an email or telephone message. In some embodiments, the knowledge base user may be the customer 20 or a technician 22 operating at the customer site who accesses the KB 12 directly. In some embodiments, a person, such as the agent, identifies the corresponding problem in the knowledge base 12 to which the problem description 18 refers, assuming that there is one. In other embodiments, this may be performed at least partly automatically.

The agent 14 may find a solution 24 in the knowledge base 12, using keyword searching or the like and provide a verbal description of the solution to the customer 20. The customer may thus be provided with a solution by the agent. The verbal description of the solution given by the agent may be stored as a voice or text record 26. In some cases, the solution contained in the recording 26 may be derived from a solution 24 in the knowledge base retrieved in response to the agent's query. However, for a new device or class of devices, the knowledge base 12 may not yet have been populated with a case that includes the problem and/or its solution. In this case, the agent may provide the customer a new solution. The recording 26 may, therefore, include a solution proposed by the agent 14, if the agent is unable to find a solution in the knowledge base. In one embodiment, the recording 26 may be a summary of the agent's conversation with the user, describing the solution in natural language, again as a text or voice recording.

In the event that the call center is unable to resolve the problem faced by the customer 20, a technician 22 may be sent to the customer site to attempt to resolve the problem with the physical device 28 which is the source of the problem. The device 28 may be an electromechanical device, such as the illustrated printer, or an electrical or electronic device, such as a computer, or other product. A "printer," as used herein can include any device for rendering an image on print media, such as a copier, laser printer, bookmaking machine, facsimile machine, or a multifunction machine (which includes one or more functions such as scanning, printing, archiving, emailing, and faxing).

The technician 22 may generate a recording 30 of the solution implemented by the technician on the physical device 28, such as a voice recording made on a digital audio recorder 32, such as a smart phone, dictation device, or the like, or a text record made on a text recording device, such as a portable computer, smart phone, or the like. An agent may be provided with an analogous voice recording device 34, which may be linked to the update system 10 via the agent's workstation 35, or the like for transmitting the voice/text recording 26 to the update system. As with the agent, the technician's recording 30 may be a contemporaneous recording, made stepwise as the actions are being performed on the device 28, or may be a summary of what was done to resolve the problem, made shortly after the repair is completed. The recording is transmitted to the update system 10.

While FIG. 1 illustrates the technician generating a recording 30 of the solution implemented on the physical device at the customer site, in other embodiments, the technician may generate a recording 30 of the solution implemented by the technician on the physical device 28 at another location, such as at a facility operated by the manufacturer, seller or maintainer of the device, for instance when devices are returned for complex repairs or on a test device 28 when the manufacturer is attempting to anticipate possible problems when the knowledge base is being created in the first instance.

The recorded solution 26, 30 generally includes a sequence of main steps, ordered in the order in which they are to be performed on the device, that are designed to effect a repair of, or modification to the device.

As will be appreciated, the solution 26, 30 recorded by the agent or technician may be a new solution, which does not yet exist in the knowledge base. Or, it may correspond to an existing solution if, for example, the agent and/or customer has not generated an appropriate query for the knowledge base or if the customer has not been able to implement an existing solution which has been provided.

The system 10 is configured for receiving the recording 26, 30 of a solution to a problem with the device 28 which has been provided by person such as the agent 14 or technician 22, using an appropriate digital voice recording device 32, 34 and to evaluate it to determine whether it corresponds to an existing solution in the knowledge base 12. If, based on the evaluation, the system 10 determines that the recording does not correspond to an existing solution, then the system may output a prompt for the knowledge base 12 to be updated. In this case, a knowledge base expert 36 may generate a new solution or case to be incorporated into the knowledge base 12.

In the following description, it is assumed that the recording 30 is received from a technician 22 who has been trained to perform repairs on the device 28. The technician dictates a solution to the problem as he or she performs a repair on the device, which may be input to the system as a voice (audio) recording 30 (or converted to text prior to input). However, it is to be appreciated that the recording 26, 30 may be otherwise generated.

Figure 2:
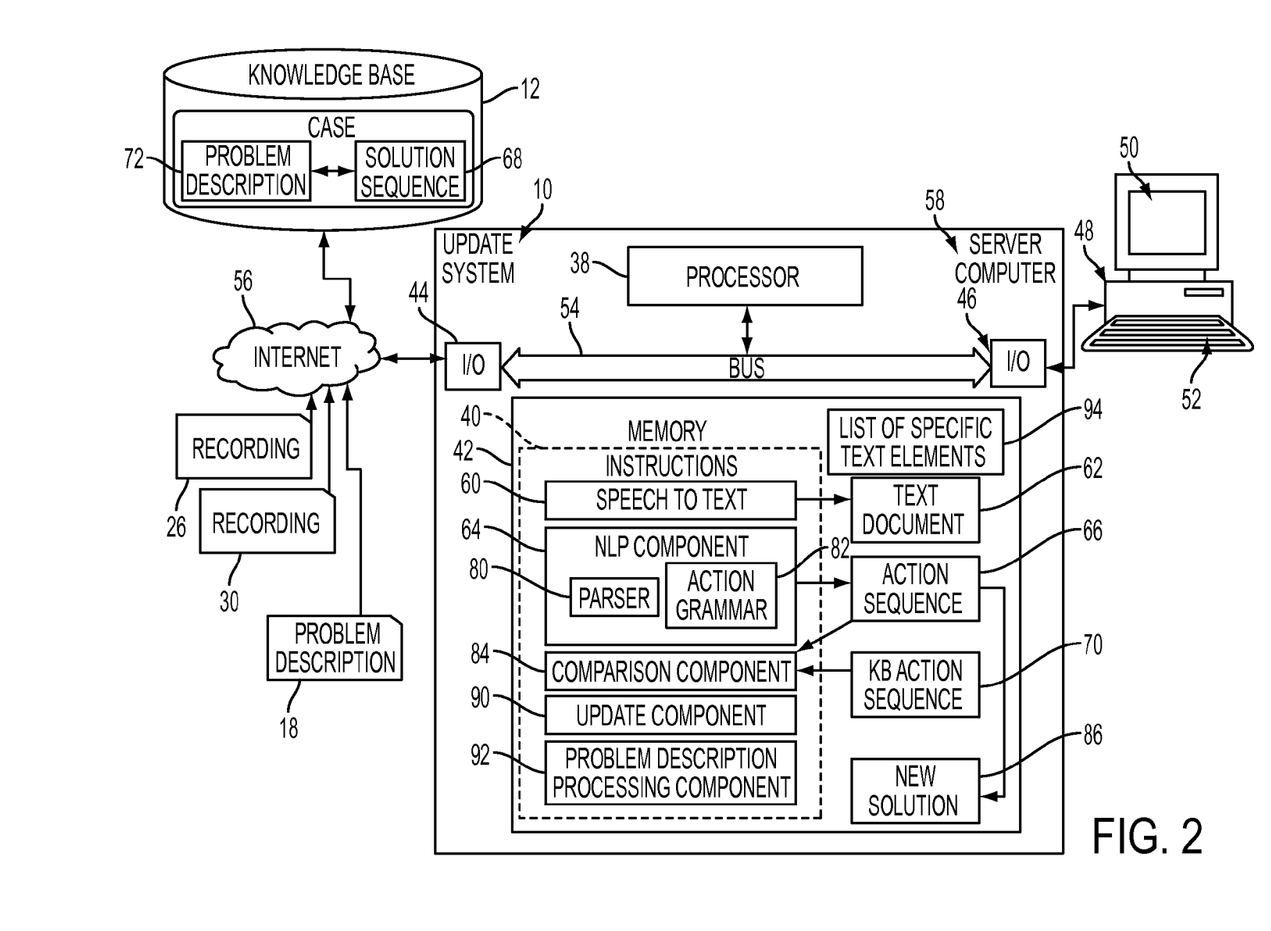
FIG. 2 is a functional block diagram illustrating one embodiment of the knowledge base update system of FIG. 1.

With reference to FIG. 2, a functional block diagram of one embodiment of the computer-implemented update system 10 is shown which may operate in the environment illustrated in FIG. 1. The illustrated update system 10 includes a processor 38, which controls the overall operation of the computer-implemented system 10 by execution of processing instructions 40 which are stored in memory 42 connected to the processor 38. Computer system 10 also includes a network interface 44 and a user input output interface 46. The network interface 44 may be communicatively connected with the knowledge base 12 and may receive as input a recording 28 or 22, generated as described above. The I/O interface 46 may communicate with a client device 48, e.g., operated by KB expert 36. The client device 48 may including one or one or more of a display 50, for displaying information to users, speakers, and a user input device 52, such as a keyboard or touch or writable screen, and/or a cursor control device, such as mouse, trackball, or the like, for inputting text and for communicating user input information and command selections to the processor of the client device 48. The various components of the system 10 may be all connected by a bus 54. Connections with the knowledge base 12 and call center and/or customer site may be made via wired or wireless links 56, such as a local area network or a wide area network, such as the Internet. Connections with the client device 48 may be made via similar wired or wireless links, such as a local area network or a wide area network, such as the Internet.

The system 10 may be hosted by any suitable computing device or devices 58, e.g., a PC, such as a desktop, a laptop, palmtop computer, portable digital assistant (PDA), server computer, cellular telephone, tablet computer, pager, combination thereof, or other computing device capable of executing instructions for performing the exemplary method. The KB 12 may be stored in memory 42 or in remote memory.

The memory 42 may represent any type of non-transitory computer readable medium such as random access memory (RAM), read only memory (ROM), magnetic disk or tape, optical disk, flash memory, or holographic memory. In one embodiment, the memory 42 comprises a combination of random access memory and read only memory. In some embodiments, the processor 38 and memory 42 may be combined in a single chip. The network interfaces 44, 46 allow the computer to communicate with other devices via a computer network, such as a local area network (LAN) or wide area network (WAN), or the internet, and may comprise a modulator/demodulator (MODEM) a router, a cable, and and/or USB or Ethernet port. Memory 42 stores instructions for performing the exemplary method as well as the processed data.

The digital processor 38 can be variously embodied, such as by a single-core processor, a dual-core processor (or more generally by a multiple-core processor), a digital processor and cooperating math coprocessor, a digital controller, or the like. The digital processor 38, in addition to controlling the operation of the computer 58, executes instructions stored in memory 42 for performing the method outlined in one or more of FIGS. 3-5.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 10. Since the configuration and operation of programmable computers are well known, they will not be described further.

The system 10 may include, in memory 42, a speech to text conversion component 60 configured for converting the recording 26, 30 generated with the voice recording device 32, 34 into a text document 62 in a natural language, typically the same language as used by the speaker, which may be stored in memory 42 during processing. Since the person recording the sequence of main steps may not use any indicators (such as the word "stop" to indicate the end of a sentence, the speech to text conversion component 60 may infer the punctuation from time gaps in the speaker's recording.

A natural language processing (NLP) component 64 processes the text document 62 to identify an action sequence 66 which includes a plurality of atomic steps, using a grammar of actions (rules for identifying the atomic action steps from the natural language text. The NLP component 64 may perform analogous processing on solutions 68 stored in the knowledge base 12 to generate a KB action sequence 70 for each different KB solution 68. Problem descriptions 72 may also be processed by NLP component 64.

The NLP component 64 may include a parser 80, such as a linguistic parser, with specific rules, referred to as an action grammar 82, which may be written on top of conventional parser rules. The NLP component thus converts recorded steps into an indexed solution 66 that can be compared with existing content in a knowledge base and added to the content if missing.

A comparison component 84 of the system 10 may perform at least an initial comparison between indexed solution 66 and indexed solutions 70 generated for solutions 68 in the KB 12, although in other embodiments a manual comparison may be performed, e.g., by the knowledge base expert 36.

The grammar of actions 82 facilitates the standardization of the recorded solution so that it can be compared with existing solutions 68 in the KB 12. It may also assist in incorporating a new solution 86 into the knowledge base, based on the action sequence 66 of atomic steps, by manually (or automatically) converting the action sequence 66 into an ordered sequence of steps in a natural language. In one embodiment, an update component 90 proposes a new solution 86 for adding to the knowledge base 12, based on the indexed solution 66.

In some embodiments, the system includes a problem description component 92, which is configured for processing the verbalized problem description 18, and comparing it with one or more problem descriptions 72 in KB. Thus, if KB and reported solutions match but their respective problems descriptions do not, this may be an indicator that a new case should be added to the KB corresponding the new problem description 18, which is linked to the existing KB solution. Since problem descriptions do not always have the same degree of formalism as the solutions, different techniques, such as keyword matching, may be used to determine the degree of similarity and the system may accept a relatively low threshold on similarity for problem descriptions to be considered a match.

The system may identify one or more of the following cases:

1. A match between the problem description 18 and a problem description 72 existing in the KB.
  a) If there is such a match and the indexed solution 66 does not match the KB indexed solution 70 for the KB problem description, this may indicate that the indexed solution 66 corresponds to a new solution to an existing KB problem description. A new solution 86 may be added to the KB corresponding to indexed solution 66.
  b) Where the indexed solution 66 does match the KB indexed solution 70 for the matching problem description 72, this may indicate that the indexed solution 66 and its corresponding problem description 72 are both already present, and no updating is needed.

2. No match between the problem description 18 and any problem description 72 existing in the KB. This may indicate that the knowledge base 12 should be updated with a new problem description and a corresponding solution 86, based on the indexed solution 66, even if the indexed solution already matches a KB indexed solution for another problem description. This may be achieved by linking the same solution to two or more problem descriptions 72.

Figure 3A:
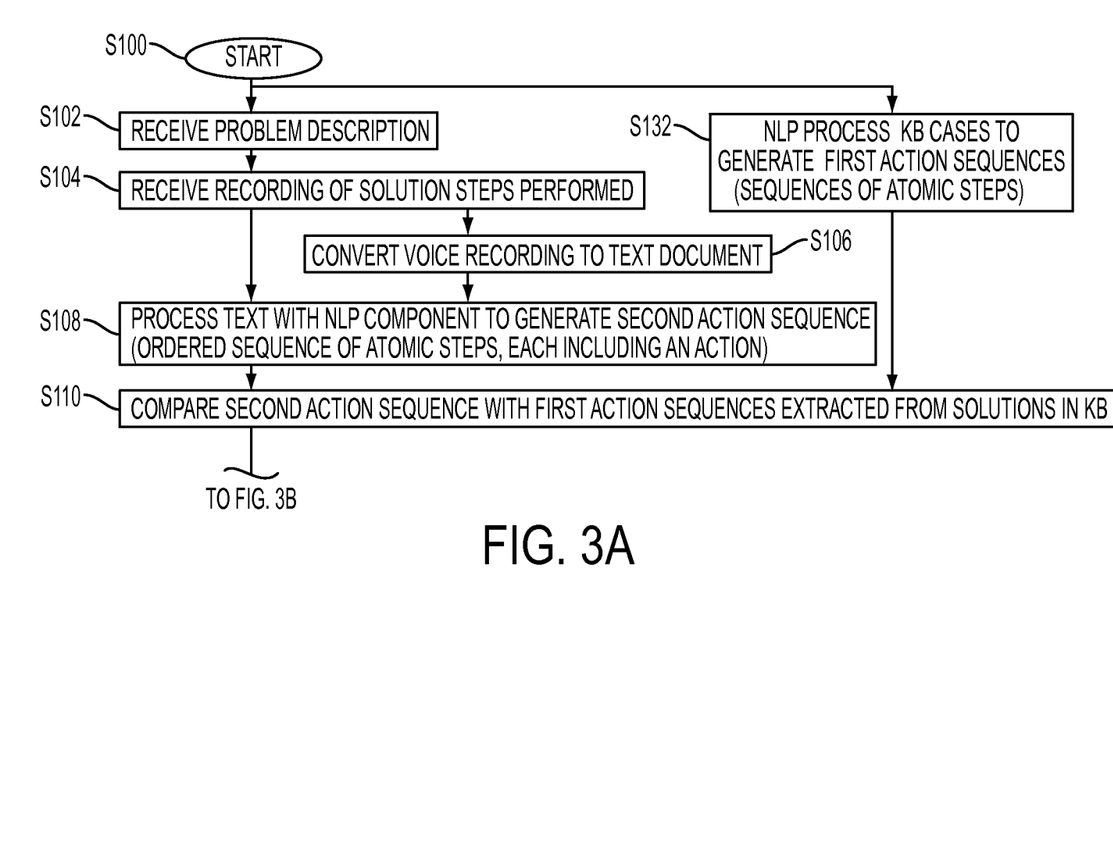
FIG. 3A is a first partial view of a flow chart illustrating a method for assisted update of a knowledge base in accordance with one embodiment.
Figure 3B:
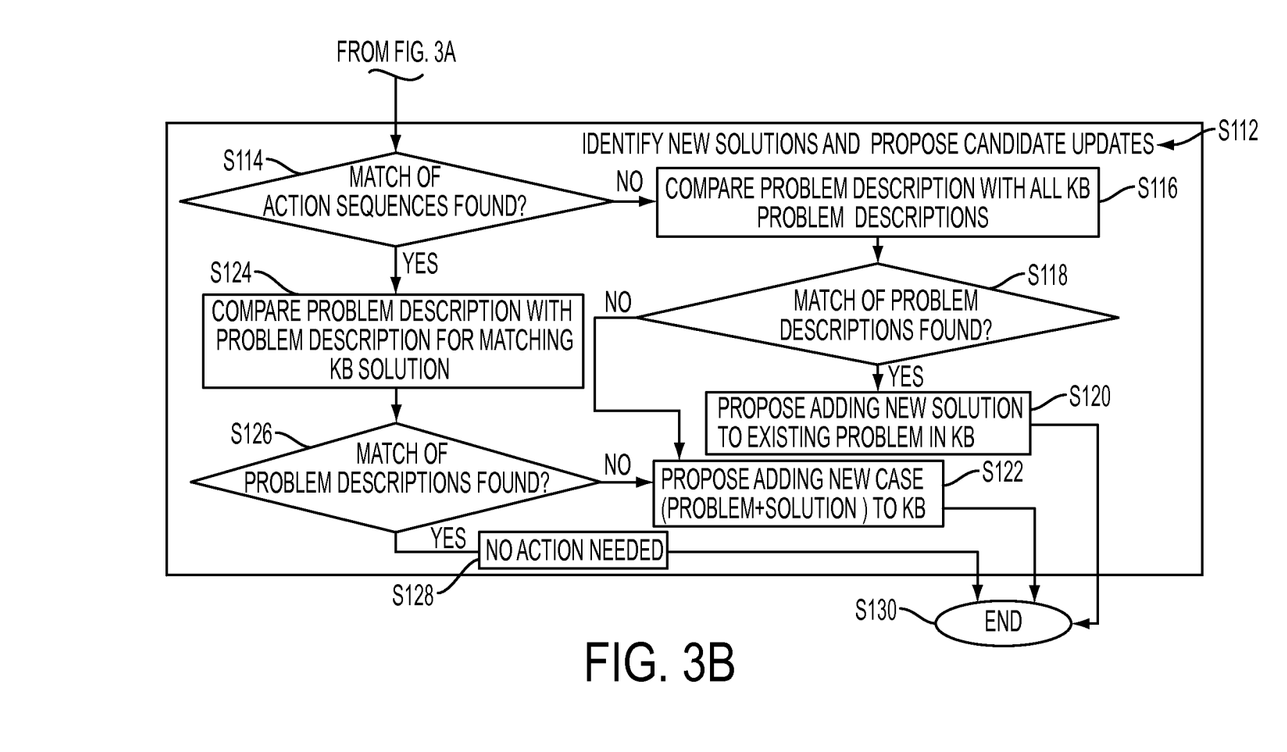
FIG. 3B is a second partial view of the flow chart illustrating the method for assisted update of a knowledge base, which together with FIG. 3A forms FIG. 3.

FIG. 3, which is split into partial views FIG. 3A and FIG. 3B, illustrates one embodiment of an exemplary method which may be performed, at least in part, by the system illustrated in FIGS. 1 and 2. The method begins at S100.

At S102, a problem description 18 may be received by the system 10.

At S104, a recording 22, 28 is received by the system 10 and may be associated, in memory with the problem description 18. In the exemplary embodiment, a technician 22 faces a product 28 with a fault or other problem and proceeds to perform a repair (which can include, for example, one or more of software modifications, replacement of consumables such as toner cartridges, replacement of physical parts of the device, and repair of these). Using, for example, a hands-free microphone connected to a recording device 32, the technician may start with a description 18 of the problem by detailing the problem using some simple keywords. The technician proceeds with a description 30 of each of the plurality of steps being performed on the device 28 while performing the repair, speaking clearly and detailing all the steps. Since the technician 24 is familiar with the terminology used in the knowledge base, the recording generally uses this terminology in the description of components of the physical device on which the technician is performing action steps.

At S106, if in voice form, the recording 30 is processed by the speech to text converter 60 that converts voice into an electronic text document 62. Otherwise, the text recording is stored as the text document 62.

At S108, the electronic text 62 is processed by the NLP component 64 to generate an action sequence 66 which may be in the form of an ordered sequence of atomic steps. Further details on the NLP processing are described below with reference to FIG. 5.

At S110, the generated action sequence 66 is then compared with the processed content of the KB 12 to identify any similar KB action sequences 70 that include actions involving the same components (e.g., by referring to the same parts of the machine 28). The order of action steps in the respective sequences may also be considered in the comparison. Conditions in the respective sequences may also be identified and compared.

Based on the results of the comparison, at S112, the update component 90 may propose updates to the KB, if, for example, there is no KB action sequence 70 that corresponds to (matches) action sequence 66.

For example, if at S114, a match is not found between the generated action sequence 66 and any of the KB action sequences 70, then at S116, the NLP processed problem description 18 may be compared by comparison component to see if it matches any of the NLP processed KB problem descriptions 72. If at S118, a problem description match is found, this may indicate that the action sequence 66 should be considered as a candidate solution to an existing KB problem. At S120, a proposal for the knowledge base to be updated may be output by the update component 90, e.g., to the client device 48 for consideration by the KB expert 36. In some embodiments, update component 90 automatically generates a new solution 86, in natural language form, based on the action sequence 66, to be added to the knowledge base. The proposed update 86 may be sent to the knowledge base expert 36 for verification or automatically added to the KB.

If no problem description match is found at S118, then at S120, provision is made for proposing an update to the knowledge base, based on the recorded solution. In one embodiment, the update component of the system may propose adding a new case to the KB which includes both a new problem description, based on the NLP-processed description 18, and a corresponding new solution 86, based on the action sequence 66. In another embodiment, as the proposal, a notification which indicates that the recorded solution does not match any of the knowledge base solutions may simply be output, e.g., in the form of a communication, such as an email, text message or the like, which may be sent to the expert.

If at S114, a match is found, then at S124, the comparison component 68 may output a determination that a solution matching the recording 26, 30 already exists in the knowledge base (or that it probably does). In some embodiments, this may terminate the method. In other embodiments, at S124, the problem description processing component 82 may determine whether the NP processed problem description 18 matches the KB problem description for the case that includes the KB solution 68 matching the action sequence 66. If at S126 a match is not found, the method may proceed to S122 where a new case may be generated. Alternatively, the system may propose that a solution 68 corresponding to the action sequence 66 may be linked to the case for which the existing KB problem description 72 matches the NLP-processed problem description 18. This may provide an additional solution to the problem or may be substituted for one or more of the existing solutions 68.

In the event that at S114, S126 a match is found between the action sequence 66 and a solution 72 of one of the cases in the knowledge base, and between the NLP processed problem description 18 and the corresponding problem description 72 in the KB, then at S128, it can be inferred that the described problem and its solution described by the technician are already in the knowledge base and that no updating of the KB is needed.

The method ends at S130.

As will be appreciated, the system may also perform NLP processing of the KB content (S132), prior to performing step S110. In other embodiments, S132 may have been performed at an earlier stage, optionally using another computing device or manually or semi-automatically. In this way, the solutions 68 in the knowledge base are processed in the same manner as the recorded solutions 62 and may be stored in memory, such as memory 42 or in remote memory accessible to the system.

Figure 4:
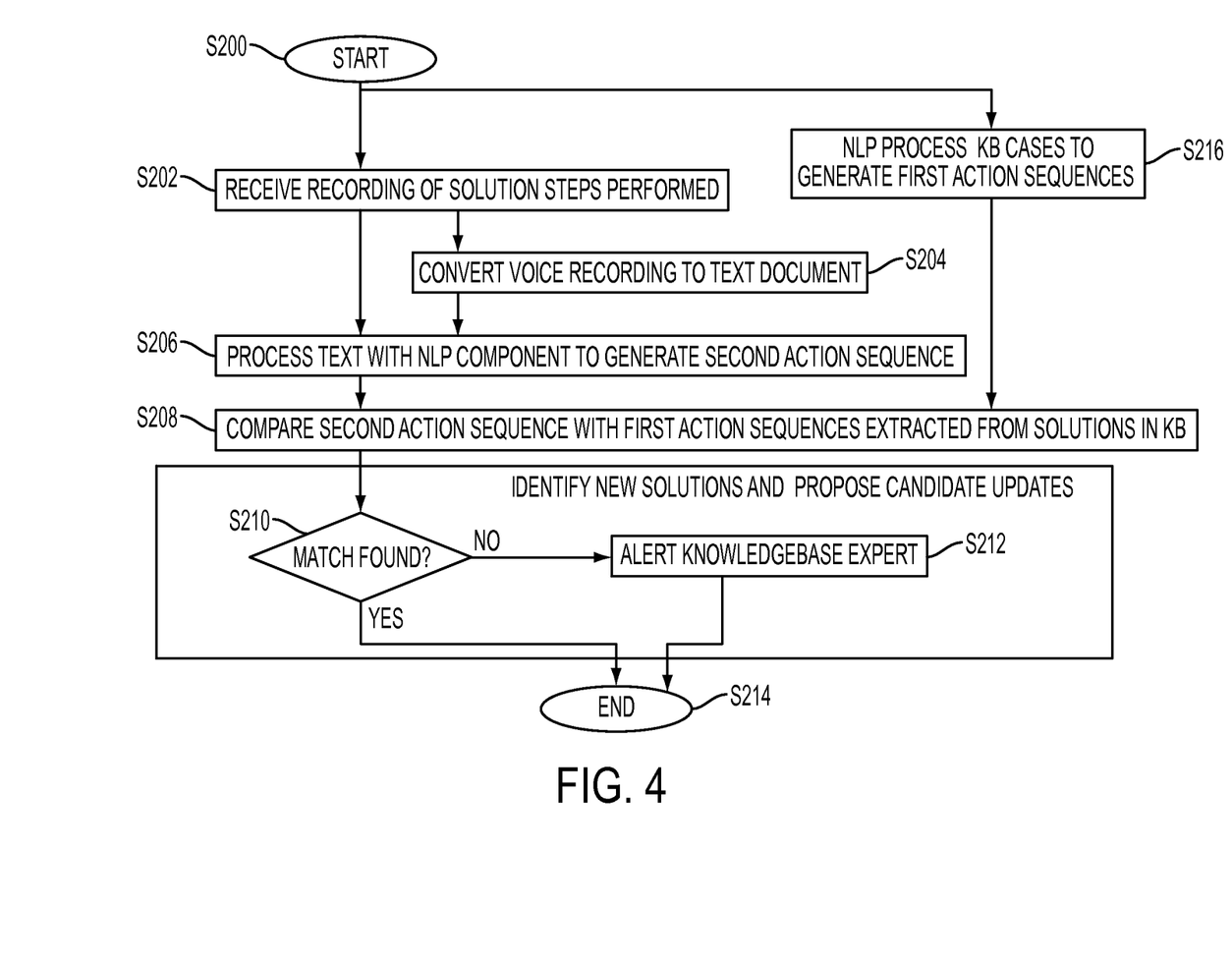
FIG. 4 is a flow chart illustrating a method for assisted update of a knowledge base in accordance with another embodiment.

The method described in FIG. 3 assumes that a verbalized problem description is processed in a similar manner to the verbalized solution. In other embodiments, the problem description may be identified in other ways, or not used. For example, the technician or call center agent may access the KB and identify the index of the problem. FIG. 4 provides an alternative method in which the problem description need not be considered by the system.

The method starts at S200. At S202, a recording is received, as for S104, and at S204 is converted to text, if not already in that form, as for S106. At S206, the electronic text 62 is processed by the NLP component 64 to generate the action sequence 66, as for S108. At S208, the generated action sequence 66 is then compared with the content of the KB 12 to identify any similar of action sequences 70, where the actions involve the same components (e.g., by referring to the same parts of the machine 28), as for S110. S216, in which the KB is NLP-processed, corresponds to S132.

Based on the comparison, e.g., if at S210 there is no match, then at S212, a proposal that the knowledge base be updated may be output, e.g., to the client device 48. If the system is informed that the sequence in the recording 26, 30 relates to a known problem that is indexed in the knowledge base, the system may propose linking the solution to the existing problem 72. If there is a match, then this information may be output or a recommendation that no updating is needed. In other embodiments, the method simply proceeds to S214. The method ends at S214.

As will be appreciated, the methods of FIGS. 3 and 4 need not be considered as mutually exclusive and that other methods for determining whether an update to the knowledge base should be proposed/implemented, based on the comparison(s) are also contemplated.

Various aspects of the method will now be described.
Speech to Text (STT) Conversion (S106, S204)

It is well known that STT is not 100% accurate. However there are conditions when the quality is better than others and this is the case when the system is trained to recognize a specific voice (e.g., that of the technician) and when the text is dictated slowly with simple phrases.

Furthermore in this specific context, the vocabulary is also very specific. The technician is generally familiar with the KB and the terminology used in it and so tends to use the terminology when dictating a sequence of solution steps. The STT tool can be customized to address this domain, for example, by asking the technician to dictate a set of words or phrases that are found in the knowledge base so that his or her pronunciation of these terms can be recognized in the conversion.
Knowledge Base Structure As noted above, the content of the knowledge base 12 is generally composed of a set of specific problem descriptions 72 with associated links to possible solutions 68. The number of cases in the KB is not limited, but is generally at least 10, or at least 100. Each problem description is associated with at least one solution 68, but may be linked to any number, such as 2, 3, 4, 5, 10, or more (but generally, fewer than all the possible solutions in the KB). Although two, or more, of the problem descriptions may have a common solution description, in general, at least some of the cases each have a different set of solutions from others of the cases. A solution is generally recorded as a text based document (in some cases, embedding images or graphics to illustrate actions to be performed) that contains a sequence of actions to be performed. The structure of the knowledge base may be generally the following:

1. A List of Cases (Problems).

Each case includes a textual description of the problem 72 and a list of possible solutions 68 for addressing the problem.

Words within the problem description 72 are indexed so a specific problem description can be found using a keyword search.

Each solution 68 includes a title and a textual document detailing the solution as a sequence of main steps.

Words within the solution title description are indexed so a specific solution can be found using a keyword search.

Each main step in the solution may be recorded in a specific data field or stored as a single text document.

Each case (problem) in the list may be accorded a unique ID, e.g.:
Problem ID=P01
Problem ID=P02
...
Each solution may be accorded a unique ID, e.g.:
Solution ID=P01
Solution ID=P02
...
For a given case, it may be stored as follows:
Problem P01
Description: Textual description of the problem
Solution ID=S01
Solution ID=S02
...
For a given solution, it may be stored as follows:
Solution S01
Title of the solution
Document detailing the sequence of actions to be performed In general, when a user looks for a solution to an existing problem in the knowledge base, the user first looks for a problem description that reflects the existing problem, using a keyword search. The user then selects from the list of solution titles one that appears to be pertinent (or simply tries each in turn until a working solution is found) and reads the content of the solution. This type of structure and use is appropriate for a human being but is not adapted well to proposing automated updates to the KB.

In the exemplary embodiment, therefore, the KB structure is enriched with information extracted by the NLP analysis.
NLP Processing (S108, S132, S206, S216)

The exemplary method is based on the use of a dedicated NLP grammar to process and validate the content of repair actions. Specifically, NLP component 64 processes the text 62 with a specific action grammar 82 that is built from vocabulary in use in the knowledge base 12. The knowledge base content is also processed with the grammar 82. The information contained in the solution description 68 (or a text document 62) may include some or all of the following types of information:

Object:
such as parts of a machine (e.g., door, trigger, handle, etc.), or software objects displayed through a graphical interface (e.g. menu, application, etc.). Linguistically, they are all related to nouns. Objects can be composed of either a simple object: only one noun, or a multi-word object: typically a noun phrase (e.g., adjective+noun, noun+noun, etc.). In the case of multi-word Objects, the head noun often carries the meaning of the expression, but in some instances, meaningful terms may appear in the set of words connected to the head noun. For example, in the sentence: "Lower the 4b handle," the handle should be lowered, but in reality, the useful information is the code name of the handle "(4b)". In order to keep as much useful information as possible, in the exemplary embodiment, all words involved in the multi-word Objects are considered to be at the same level. This means that for the sentence Lower the 4b handle, the object can be stored as: Obj1 [4b, handle].

Context (Modifier):
These are adjectives related to objects (e.g. left, right, up, down, etc.).

Action:
This is a verb (generally, a verb in the imperative form) requesting that an action be performed on a specific element or object (e.g. open, push, pull, click, activate, etc.)

Condition:
this relates to a part of a sentence that contains a conjunction such as "IF" and then a description of the condition. A Condition is generally followed by an Action (e.g., "if the power cord is plugged in, unplug it". A Condition can also be introduced using a verb with a passive form (e.g., "the power cord should be unplugged", which can be reformulated as the example sentence above).

Atomic Step:
This is a binary or ternary data item that is composed of: an Object, an Action (verb), and optionally a Context. At least some or all of the atomic steps include an Action and an Object. Conditions may also be formulated as atomic steps. For example given the sentence "If the door is open, close the door." The action grammar may generate a Condition followed by an Atomic Step:
if (Condition) door (Object) open (Action)
close (Action) door (Object)
In some embodiments, the conditions are ignored. In other embodiments, they are included in the action sequence of atomic steps generated.

Main Step:
this may be composed of an ordered sequence of atomic Steps or a condition followed by one or several atomic steps, and may correspond to a single step in a solution sequence. The granularity of the main steps depends on the drafting of the KB by the solution builder, who may want to reduce the number of main steps (and therefore aggregate atomic steps) or conversely, keep them simple. In the exemplary embodiment, the main steps are broken down into a sequence of atomic steps, for ease of comparison.

In the specific context of a solution description, the verbal forms often encountered are:
1. Present or present progressive form: for Conditions with a conjunction (e.g., "if the printer is working").
2. Past form for conditions without conjunctions (e.g., "the power cord should be unplugged").
3. Imperative form: for actions to be performed. In the exemplary embodiment, the atomic steps each include a verb in the imperative form (an Action).

Figure 5:
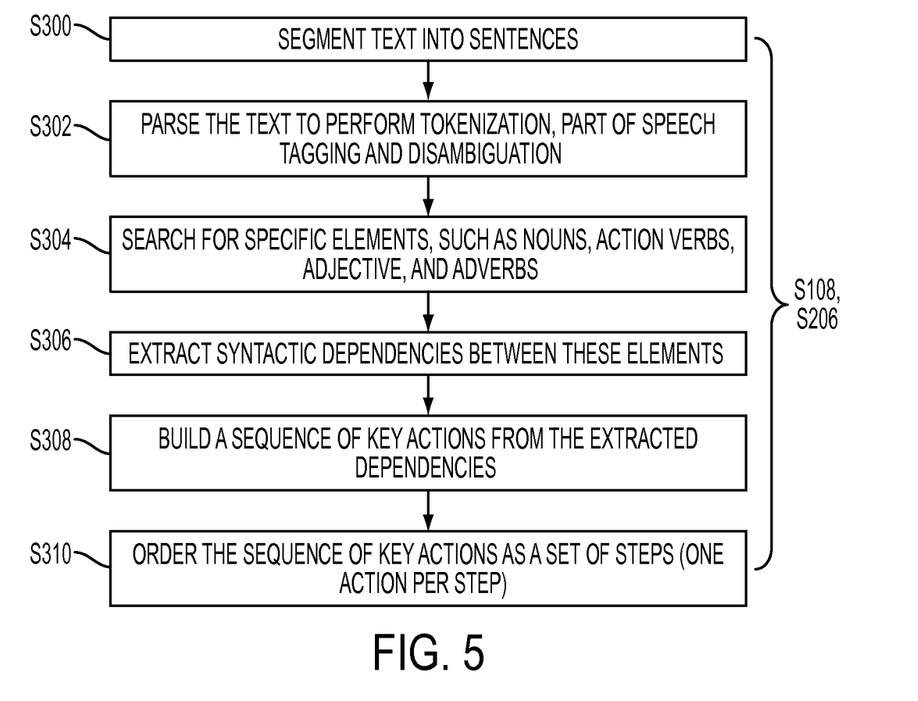
FIG. 5 illustrates aspects of the method of FIGS. 3 and 4.

The NLP processing (S108, S132, S206, S216) may be performed as illustrated in FIG. 5.

At S300, the text is segmented into sentences.

At S302, the text 62 is parsed. This may include performing tokenization, part-of-speech (POS) tagging, and disambiguation. In tokenization, the sentences, or other text sequences are broken down into their constituent words, and other text elements. In initial POS tagging, each token is associated with one or more parts of speech, e.g., based on a lexicon (or none, if the word is not recognized). In disambiguation, each word token is associated with one, most probable, part of speech, e.g., when two or more have been identified, or when none has, e.g., based on the role of the token in the sentence. Coreference resolution may also be performed so that pronouns may be tagged with the Object (e.g., noun phrase) to which they relate.

At S304, working on the parsed text, specific elements are identified, where present, such as nouns, action verbs, adjectives, and adverbs. In the case of action verbs, for example, a list 94 composed of a specific set of action verbs may have been previously stored (e.g., as the infinitive form), such as those found in the knowledge base that are generally used in connection with actions performed on the device. The list of action verbs may be supplemented with synonyms of the KB action verbs, e.g., identified from a thesaurus, or manually. The action verbs list may be accessed in S202 and only those action verbs in the parsed text that are recognized in the action verb list may be associated with a specific action verbs tag. Similar lists may be provided for nouns (identified by their root form) and adverbs that are found in the KB, and their respective synonyms. In other embodiments, the system simply identifies action verbs in the imperative form.

At S306, syntactic dependencies between these specific elements are extracted. A syntactic dependency is a directed link between first and second words (or phrases) in which one is a dependent argument and the other is its head argument. Syntactic dependencies can be of various classes. Of particular interest for this application are those in the following classes:

"subj" (subject), where the head argument is a verb and the dependent argument (Object) is a noun or noun phrase which serves as the subject of the verb in the sentence or clause where the dependency is found.

"dobj" (direct object), where the head argument is a verb and the dependent argument (Object) is a noun or noun phrase which serves as the direct object of the verb in the sentence or clause where the dependency is found.

"attr" (attribute relation between a noun and an adjective (Context)), for identifying multi-word Objects.

The action grammar 82 specifies rules for converting the identified dependencies of interest into atomic steps in a formulized manner, as described below.

At S308, a sequence of actions is built from the extracted dependencies.

At S310, the sequence of actions is ordered as a set of atomic steps (one action per atomic step), together with any conditions.

The method then proceeds to S110 (S208) where the generated action sequence of atomic steps (and conditions) is then compared with action sequences of atomic steps (and conditions) generated from the content of the KB to determine whether there is a matching sequence of atomic steps comprising key actions involving the same Objects (e.g., components of the machine). The order of atomic steps is also considered such that matching sequences are arranged in the same (or substantially the same) order. As used herein, a match can be an exact match or a similar sequence of actions, for example, when a threshold on similarity is found. In some embodiments, the Conditions, where present, are ignored in the matching.

If a matching action sequence 70 in the KB is found, this suggests that the recorded solution 30 may already be in the KB. If no matching sequence is found, then the recorded solution may be new and therefore a candidate for KB update. In general, that has to be validated by experts.

As will be appreciated, a detailed recorded solution 30, as dictated by a technician, may be complex and contain many different conditions that drive actions to be performed. In one embodiment, the method focuses on the indexing of Atomic Steps, each consisting of no more than one single Action. This helps to address the problem that conditions may appear at different steps of the solution, depending on the technician's thought process, or be absent in some cases. Therefore the parsing and indexing of solutions may be performed as follows:

On the text of the solution apply the NLP component 64 to perform an algorithm as follows:

Algorithm 1

1. Segment the text into sentences.
2. Create a Solution scenario dataset S1 (initially empty).
3. For each sentence:

Algorithm 1

4. Extract syntactic dependencies.
5. For dependencies involving an imperative verb (VI1) and a noun (NH1), for each one do:
6.  Create a new Action dataset A1.
7.  Search for possible noun-noun dependencies involving the head noun (NH1).
8.    If there are several noun-noun dependencies then create a new Object dataset as Object O1 (noun1, noun2, . . . , noun NH1).
9.    Else Create a new Object dataset as Object (noun NH1)
10.  Build the Action dataset as ACTION A1 (Verb, Object O1).
11.  Add the ACTION A1 into the Solution scenario S1 keeping the same order of appearance as in the initial text.
12.  If there are several imperative verbs in the sentence then repeat step 11.
13. Output Solution scenario dataset S1.

Note that step 1 corresponds to S300, step 4 to S306, and the remaining steps to S308 and S310 of FIG. 5. The algorithm assumes the remaining steps of FIG. 5 are also performed. Algorithm 1 only considers imperative verbs, although in other embodiments, actions associated with conditions are also considered (e.g., if the door is locked, or the door should be unlocked).

The output by the NLP component is a Solution scenario dataset (action sequence) 66 for each text document 62, that is composed of an ordered list of Atomic Steps (referred to in Algorithm 1 as ACTIONS) composed of an action verb (Action) and one or several Object nouns and optionally one or more Conditions. This list will be used as a finger print to index the solution.

In the exemplary embodiment, the same indexing method described in algorithm 1 and FIG. 5 is applied to each of the solution sequences 68 in the KB to provide a respective action sequence 70 (S132, S216). In this way, each solution recorded in the knowledge base is indexed with its characteristic list of Atomic Steps. Then once a technician records a solution that is converted into an electronic text format, the same method is applied to extract the related list of Atomic Steps.

Comparing Sequences of Actions

At S110 (S208) a search is performed in the knowledge base to find a possible match between first and second (KB and recorded) action sequences 70, 66. Briefly, this may include determining whether the Actions of the atomic steps of first and second action sequences match and are in the same order and if so, comparing the Objects of the matching atomic steps to see if they also match. If the Actions and their respective Objects of each of the atomic steps of the first and second action sequences match (e.g., are the same or satisfy a threshold level of similarity) and the atomic steps match in their order (e.g., are the same or satisfy a threshold level of similarity in the order), it is assumed that the second action sequence is present in the knowledge base and no further action is needed. Otherwise, a notification may be output.

The search may be performed as follows.

Let ST1 be the recorded solution from the technician which has been processed to generate an action sequence (Action Seq.) 66 composed of the following atomic steps, labeled Action STA-1 to Action STA-n, each including an Object and a Verb:

ST-1 (Action STA-1 (Verb stay-1, Object stao-1), . . . , Action STA-n (Verb stav-n, Object stao-n))

An example method of searching is shown in Algorithm 2:

---
Algorithm 2
---

1. Create a dataset LSID (initially empty) to record an ordered list of datasets containing a list of solution identifiers (LID) that will be collected from the knowledge base KB: LSID (LID-1 [ID-1, . . . , ID-n], . . . , LID-m [ID-k, . . . , ID-z],)
2.   For each Verb stav-i appearing in the Action Seq. ST-1
3.     Create a new dataset LID-i for recording solution IDs from the KB
4.     Search the KB to find all solution IDs where the verb stav-i occurs and record the list inside LID-i
5.     Record LID-I in LSID
6.   In LSID, search for solution IDs that appear in all LID recorded in LSID
7.     If there is no such solution ID, then the Action Seq. ST-1 may be new. Prompt manual validation by a KB expert before recording in into the KB
8.     If there is 1 or several IDs (ID-0, ID-1, . . . , ID-h) appearing in all LIDs then
9.       For all solutions (related to matching IDs) compare order of appearance of each verbs with the order of appearance of verbs in Action Seq. ST-1.
10.       If the order is not the same, then solution ST-1 may be new (or a variant of an existing solution). Prompt manual validation by a KB expert before recording in into the KB.
11.       If there is still 1 or several solutions (IDs) with same verb and appearing in the same order, then check if related Objects from solution ST-1 match objects from the solutions in the KB
12.         If there is at least 1 ID with an indexed solution that matches the same verbs, in the same order, with the same Objects, then the solution is not new. No need to update the KB
13.         If there is no indexed solution from the KB that matches solution ST-1, then this solution may new. Prompt manual validation by a KB expert before recording it into the KB

---

As will be appreciated, Algorithm 2 is a detailed method for determining when a recorded action sequence 66 matches a KB action sequence 70, and that other methods for comparing the verbs and objects in the sequences 66, 70 being compared are also contemplated. The exemplary method may reduce computation time by first determining, whether the KB lacks a KB action sequence that includes the set of verbs used in the atomic steps generated from document 62 (step 4 of algorithm 2). If there is no KB action sequence including all the verbs, it can be assumed that the sequence 66 is not included in the KB and that a corresponding new solution 86 should be generated (which may be output for validation by the KB expert) (Step 7 of Algorithm 2).

On the other hand, if there at least one such KB action sequence that has a matching set of action verbs, then further tests are performed to determine whether there is a match between the sequences, such as checking the order of the Action verbs (step 9 of Algorithm 2) and checking the Objects that are used with the verbs (step 10 of Algorithm 2). If there is no KB sequence 70 of atomic steps that matches both the verb order and the respective objects, this suggests that the sequence of atomic steps 66 is not included in the KB and that a corresponding new solution 86 should be generated (which may be output for validation by the KB expert).

In the case where an Object in the action sequence 66 includes more than one noun (e.g., Object O1 (noun1, noun2, . . . , noun NH1)) then in the comparison between the Object O1 and a KB Object, two Objects may be considered as equivalent if there is at least one noun that appear in both Objects. For example lift the handle is considered equivalent to lift the 4b handle.

Since the technician may have performed steps in a slightly different order from the KB action sequence (with the same result) or may not have recorded all the steps that were in fact performed, the lack of an exact match may not always signify that the action sequence 66 is not included in the KB. In some embodiments, therefore, an exact match between verb order is not required and when comparing two solutions small variations are permitted (for example, the matching may permit switching two actions). Also, as noted above, the use of synonyms may be permitted in the comparison, allowing replacing some verbs by others with the same meaning (e.g., "Look"~"check").

The method illustrated in one or more of FIGS. 3-5 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 58, (for example, an internal hard drive of RAM), or may be separate (for example, an external hard drive operatively connected with the computer 58), or may be separate and accessed via a digital data network, such as a local area network (LAN) or the Internet (for example, as a redundant array of inexpensive of independent disks (RAID) or other network server storage that is indirectly accessed by the computer 58, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in any one or more of FIGS. 3-5, can be used to implement the method identifying candidate updates for a knowledge base. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Example Application

Given the following solution dictated by a technician:

Open the Front Door. Look into Area 3a and remove any paper obstructions then Lower the 3b handle to the right. Check for and remove any paper obstructions found in Area 3b. Close the front door.

The indexing of solution 62 after the NLP analysis may be produce the following action sequence 66:

```
ST-1    {    sta-1 (open, stao-1 [Front, Door] ),
             sta-2 (look, stao-2 [area, 3a] ),
             sta-3 (remove, stao-3 [paper, obstruction] ),
             sta-4 (lower, stao-4 [3b, handle] ),
             sta-5 (check, stao-5 [paper, obstruction] ),
             sta-6 (remove, stao-6 [paper, obstruction] ),
             sta-7 (close, stao-7 [front, door] ),
        }
```

Assuming that among existing solutions inside the KB there is the following solution 68:

1) Open the Front Door.
2) Look into part 3a and remove any possible paper jam.
3) Lower the 3b handle to the right.
4) Look for paper in Area 3b and remove any paper obstructions
5) Close the front door The solution indexing 70 may then be as follows:

```
SKB-1   {    skba-1 (open, skbao-1 [Front, Door] ),
             skba-2 (look, skbao-2 [part, 3a] ),
             skba-3 (remove, skbao-3 [paper, jam] ),
             skba-4 (lower, skbao-4 [3b, handle] ),
             skba-5 (look, skbao-5 [paper] ),
             skba-6 (remove, skbao-6 [paper, obstruction] ),
             skba-7 (close, skbao-7 [front, door] ),
        }
```

So when solutions 66, 70 are compared, the output may be as follows:

```
sta-1 match skba-1 < = (open = open, [Front, door] = [Front
door] ),
sta-2 match skba-2 < = (look = look , [3a] = [3a] ),
sta-3 match skba-3 < = (remove = remove , [paper] = [paper] ),
sta-4 match skba-4 < = (lower = lower , [3b, handle] = [3b,
handle] ),
sta-5 match skba-5 < = (check ~ look , [paper] = [paper] ), here
look and check have been identified as similar
sta-6 match skba-6 < = (remove = remove , [paper, obstruction] =
[paper, obstruction] ),
sta-7 match skba-7 < = (close = close , [front, door] = [front,
door] ),
```

As can be seen, the atomic steps are similar and appear in the same order. In this case, the two solutions are considered to be a match and therefore it is determined that there is no need to update the knowledge base with a new solution.

The exemplary method thus provides several advantages by combining the following elements:

1. A STT transformation of a solution dictated by a person (e.g., technician).
2. An NLP analysis of the recorded solution from the technician to build a specific indexing of this solution as a sequence of actions 66 (atomic steps).
3. A similar indexing of all solutions in the KB.
4. A mechanism to compare the indexed solution from the technician with indexed solutions from the KB to identify potentially new solutions.

While the method has been described in the context of a call center, it is to be appreciated that the method may have applications in keeping up to date other knowledge bases for problem solving.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for proposing candidate solutions for updating a knowledge base, comprising:

for each of a set of knowledge base solutions, each knowledge base solution comprising a sequence of main steps, expressed in a natural language, to be performed on a class of device, processing the knowledge base solution to generate a first action sequence of atomic steps, each of the atomic steps including a verb and an object, the object comprising a noun which is in a syntactic dependency with the verb;

receiving a recorded solution, expressed in a natural language, comprising actions performed on a device in the device class;

processing the recorded solution to generate a second action sequence of atomic steps, each of the atomic steps including a verb and an object, the object comprising a noun which is in a syntactic dependency with the verb;

with a processor, comparing the second action sequence with each of the first action sequences to determine whether the recorded solution corresponds to one of the knowledge base solutions; and based on the comparison, providing for proposing an update to the knowledge base, based on the recorded solution.

2. The method of claim 1 wherein the recorded solution is an audio recorded solution and the method further includes converting the audio recoded solution to a text recorded solution.

3. The method of claim 1, wherein the processing of at least one of the knowledge base solution and the recorded solution to generate an action sequence comprises:

extracting syntactic dependencies that involve an imperative verb and a head noun;

building an atomic step from the imperative verb and an object, the object comprising the head noun and any other nouns that are in a syntactic dependency with the head noun, and optionally any context.

4. The method of claim 3, wherein for a verb which is in a syntactic dependency with a plurality of head nouns, the building of the atomic step includes building an atomic step for each of a plurality of objects, each of the plurality of objects including a respective one of the head nouns.

5. The method of claim 1, wherein the verb in at least some of the atomic steps being compared is in an imperative form.

6. The method of claim 1, wherein each atomic step includes at most one verb in the imperative form.

7. The method of claim 1, wherein the comparing includes comparing a second set of action verbs in the second action sequence with first sets of action verbs in respective first action sequences.

8. The method of claim 7, wherein in the comparing, synonyms of the verbs in the atomics steps are considered in determining whether there is a match between the sets of action verbs.

9. The method of claim 1, wherein each atomic step includes at most one object, each object including at least one noun.

10. The method of claim 1, wherein each atomic step optionally includes a context which is related to the object.

11. The method of claim 1, wherein the action sequences being compared optionally include at least one condition and the comparing includes comparing any conditions.

12. The method of claim 1, wherein the processing of at least one of the knowledge base solutions and the recorded solution comprises identifying objects comprising at least one noun, and wherein the comparing of the second action sequence with the first action sequences comprises finding a match between objects of respective atomic steps when the objects include at least one matching noun.

13. The method of claim 1, wherein the providing for proposing an update to the knowledge base, based on the recorded solution comprises generating a new solution to be added to the knowledge base based on the recorded solution or sequence of atomic steps, where it is determined that there is no matching solution.

14. The method of claim 1, further comprising determining whether a description of a problem associated with the recorded solution matches a description of a problem associated with a knowledge base solution and based on the determination, providing for proposing an update to the knowledge base to link an existing solution in the knowledge base to the matching problem description.

15. The method of claim 1, wherein the device class comprises printers and the device comprises a printer.

16. The method of claim 1, wherein the recorded solution is made by a person who records the solution based on actions performed on the device during a repair of the device or by an agent who instructs a person to perform actions on the device during a repair of the device.

17. The method of claim 1, wherein the providing for proposing an update to the knowledge base comprises outputting a notification which indicates that the recorded solution does not match any of the knowledge base solutions.

18. A system comprising memory which stores instructions for performing the method of claim 1 and a processor in communication with the memory for executing the instructions.

19. A computer program product comprising a non-transitory recording medium storing instructions, which when executed on a computer, causes the computer to perform the method of claim 1.

20. A system for proposing candidate solutions for updating a knowledge base, comprising:
memory which stores a set of processed knowledge base solutions derived from a knowledge base, each processed knowledge base solution comprising a first action sequence of atomic steps, at least some of the atomic steps including a verb and an object, the object comprising a noun which is in a syntactic dependency with the verb;
a natural language processing component which receives a recorded solution, in a natural language, of actions performed on a device to which the knowledge base relates, and which processes the recorded solution to generate a second sequence of atomic steps, each of the atomic steps including a verb and an object comprising a noun which is in a syntactic dependency with the verb;
a comparison component for comparing the second action with the first action sequences to determine whether the recorded solution is a new solution;
an update component which provides for proposing to update the knowledge base with a candidate new solution, based on the recorded solution; and
a processor which implements the natural language processing component, comparison component, and update component.

21. The system of claim 20, further comprising:
a speech to text conversion component for converting an audio recorded solution to a text recorded solution.

22. The system of claim 20, further comprising:
a problem description processing component which compares a problem description associated with the recorded solution with problem descriptions in the knowledge base.

23. The system of claim 20, wherein the natural language processing component is configured for generating the set of processed knowledge base solutions from content of an associated knowledge base.

24. A method comprising:
providing access to a set of first action sequences stored in memory that are derived from a knowledge base, each first action sequence comprising a sequence of atomic steps, each of the atomic steps including an action;
receiving a recorded solution, in a natural language, of actions performed on a device in the device class;
processing the recorded solution to generate a second action sequence of atomic steps, each of the atomic steps including an action;
with a processor, for each of the first action sequences, comparing the respective sequence of atomic steps with the sequence of atomic steps in the second action sequence; and
based on the comparison, determining whether the recorded solution exists in the knowledge base.

* * * * *